United States Patent [19]
Xia et al.

[11] Patent Number: 5,986,899
[45] Date of Patent: Nov. 16, 1999

[54] SINGLE ENDED FORWARD DC-TO-DC CONVERTER PROVIDING ENHANCED RESETTING FOR SYNCHRONOUS RECTIFICATION

[75] Inventors: Gang Xia, Bedford; Fei Ma, Malden, both of Mass.

[73] Assignee: International Power Devices, Inc., Boston, Mass.

[21] Appl. No.: 09/266,199

[22] Filed: Mar. 10, 1999

Related U.S. Application Data

[63] Continuation of application No. 09/105,511, Jun. 26, 1998, Pat. No. 5,886,881, which is a continuation of application No. 08/730,684, Oct. 11, 1996, Pat. No. 5,781,420.
[60] Provisional application No. 60/022,555, Jul. 18, 1996.

[51] Int. Cl.⁶ ................................................... H02M 3/335
[52] U.S. Cl. ............................... 363/21; 363/16; 363/20
[58] Field of Search ................................ 363/16, 20, 21, 363/95, 97, 131

[56] References Cited

U.S. PATENT DOCUMENTS

| | | | |
|---|---|---|---|
| 4,441,146 | 4/1984 | Vinciarelli | 363/20 |
| 4,688,160 | 8/1987 | Fraidlin | 363/21 |
| 4,809,148 | 2/1989 | Barn | 363/20 |
| 4,975,821 | 12/1990 | Lethellier | 363/21 |
| 5,111,372 | 5/1992 | Kameyma et al. | 363/20 |
| 5,126,931 | 6/1992 | Jitaru | 363/21 |
| 5,291,382 | 3/1994 | Cohen | 363/16 |
| 5,353,212 | 10/1994 | Loftus et al. | 363/17 |
| 5,434,767 | 7/1995 | Batarseh et al. | 363/16 |
| 5,434,768 | 7/1995 | Jitaru et al. | 363/21 |
| 5,457,620 | 10/1995 | Dromgoole | 363/21 |
| 5,521,807 | 5/1996 | Chen et al. | 363/21 |
| 5,528,482 | 6/1996 | Rozman | 363/21 |
| 5,610,508 | 3/1997 | Kammiller | 363/97 |
| 5,625,541 | 4/1997 | Rozman | 363/21 |
| 5,636,106 | 6/1997 | Batarseh et al. | 363/16 |
| 5,636,107 | 6/1997 | Lu et al. | 363/20 |
| 5,708,571 | 1/1998 | Shinada | 363/16 |
| 5,734,563 | 3/1998 | Shinada | 363/21 |
| 5,781,420 | 7/1998 | Xia et al. | 363/21 |
| 5,805,432 | 9/1998 | Zaitsu et al. | 363/16 |
| 5,862,043 | 1/1999 | Youn et al. | 363/21 |
| 5,872,705 | 2/1999 | Loftus et al. | 363/21 |
| 5,886,881 | 3/1999 | Xia et al. | 363/21 |

*Primary Examiner*—Matthew Nguyen
*Attorney, Agent, or Firm*—Testa, Hurwitz & Thibeault, LLP

[57] ABSTRACT

A single ended forward DC-to-DC converter includes a transformer having a primary winding electrically connected to a primary switch and a secondary winding electrically connected to a secondary switch and a clamping capacitor. The clamping capacitor stores the magnetization energy from the secondary winding when the primary switch is turned off, thus causing the transformer core to be reset during the period that the primary switch remains off. The converter can use mosfets as the primary and secondary switches, such that a change in the voltage at the secondary winding of the transformer, due to the turning off of the primary switch, results in an automatic turning on of the secondary switch. The combination of the clamping capacitor and the mosfet switches increases the simplicity of the DC-to-DC converter while eliminating undesirable characteristics such as dead time and voltage stresses on the switches. The DC-to-DC converter of the present invention can be used to carry out synchronous rectification and zero voltage switching.

5 Claims, 8 Drawing Sheets

SINGLE ENDED FORWARD DC-TO-DC CONVERTER PROVIDING ENHANCED RESETTING FOR SYNCHRONOUS RECTIFICATION

RELATED APPLICATIONS

This application is a continuation of co-pending U.S. patent application Ser. No. 09/105,511, filed on Jun. 26, 1998, and which will issue as U.S. Pat. No. 5,886,881 on Mar. 23, 1999, which is a continuation of U.S. patent application Ser. No. 08/730,684, filed on Oct. 11, 1996, now U.S. Pat. No. 5,781,420, which claims priority to pending provisional application, Ser. No. 60/022,555, filed on Jul. 18, 1996, the contents of which are incorporated herein by reference.

FIELD OF THE INVENTION

This invention relates to DC-to-DC converters, more particularly to single ended forward DC-to-DC converters having circuitry for resetting a transformer core.

BACKGROUND OF THE INVENTION

DC-to-DC converters are used to convert an input DC voltage to a different output DC voltage for delivery to a load. Such converters typically comprise a transformer that is electrically coupled via a switching circuit between the voltage source and the load. Converters known as single-ended forward converters are a class of converters that rely on a single switch connected between the voltage source and the primary winding of the transformer to provide forward power transfer to the secondary winding of the transformer when the switch is on and conducting.

To discharge the leakage inductance at the transformer, the transformer core is "reset" during the off period of the switch. Resetting is typically accomplished with the use of additional circuitry, such as a third transformer winding in parallel with the primary transformer winding, or a LC resonant circuit electrically coupled to the secondary winding. The driving waveforms of such circuitry, however, exhibit a "dead time", a period during which the switch remains open, the voltage across the switch equals the source voltage, and the current vanishes. Dead time decreases the overall efficiency of the converter and places voltage stresses on the switch.

It is an object of the present invention to provide a single-ended forward DC-to-DC converter that effectively resets the transformer core while exhibiting substantially no dead time and minimizing voltage stress on the components thereof.

SUMMARY OF THE INVENTION

The invention relates to a single ended forward DC-to-DC converter that effectively resets the transformer core, thereby enhancing its ability to carry out self-driven synchronous rectification. In one embodiment, the converter comprises a transformer having a primary winding electrically connected to a primary switch, and a secondary winding electrically connected to a secondary switch and a clamping capacitor. The secondary winding is in electrical communication with a pair of rectifiers and an LC filter circuit that provides rectification and smoothing of the power signal that reaches the load. When the primary switch is on, the primary winding is conductive and an input voltage exists across the secondary winding. When the primary switch is turned off, the secondary switch is turned on, a magnetizing current existing in the secondary winding is transferred to the clamping capacitor, and the clamping capacitor is charged to substantially the input voltage. During the period that the primary switch is off, the voltage across the secondary winding is maintained constant, and the transformer core is reset In other embodiments of the invention, the primary and secondary switches include MOSFET switches. In such embodiments, when the primary MOSFET switch is open, a voltage appearing at the secondary winding causes the secondary MOSFET switch to become conductive. In still other embodiments, the primary switch comprises an n-channel MOSFET and the secondary switch comprises a p-channel MOSFET. In yet another embodiment, the secondary switch comprises an n-channel MOSFET and the secondary winding is electrically coupled with a third winding. The third winding provides a positive voltage necessary to activate the n-channel MOSFET.

Other embodiments of the invention relate to a method for resetting the core of the transformer by activating and deactivating a primary MOSFET coupled to a primary winding of a transformer, such that upon deactivation, the secondary MOSFET is activated, a clamping capacitor is charged, and the secondary winding is clamped to the voltage of a clamping capacitor.

The present invention provides synchronous rectification and zero voltage switching, techniques that are useful in providing lower output voltages and higher power densities at the load. Moreover, the use of a clamping capacitor and MOSFET switches increases the simplicity of the DC-to-DC converter while eliminating undesirable characteristics such as dead time and voltage stresses on the switches.

These and other features of the invention will be made apparent from the description below and the claims.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 2B is a section of the single-ended forward DC-to-DC converter of FIG. 2A that is conducting when the primary switch is on.

FIG. 3B is a section of the single-ended forward DC-to-DC converter of FIG. 3A that is conducting when the primary switch is on.

DETAILED DESCRIPTION OF THE INVENTION

Figure 1:
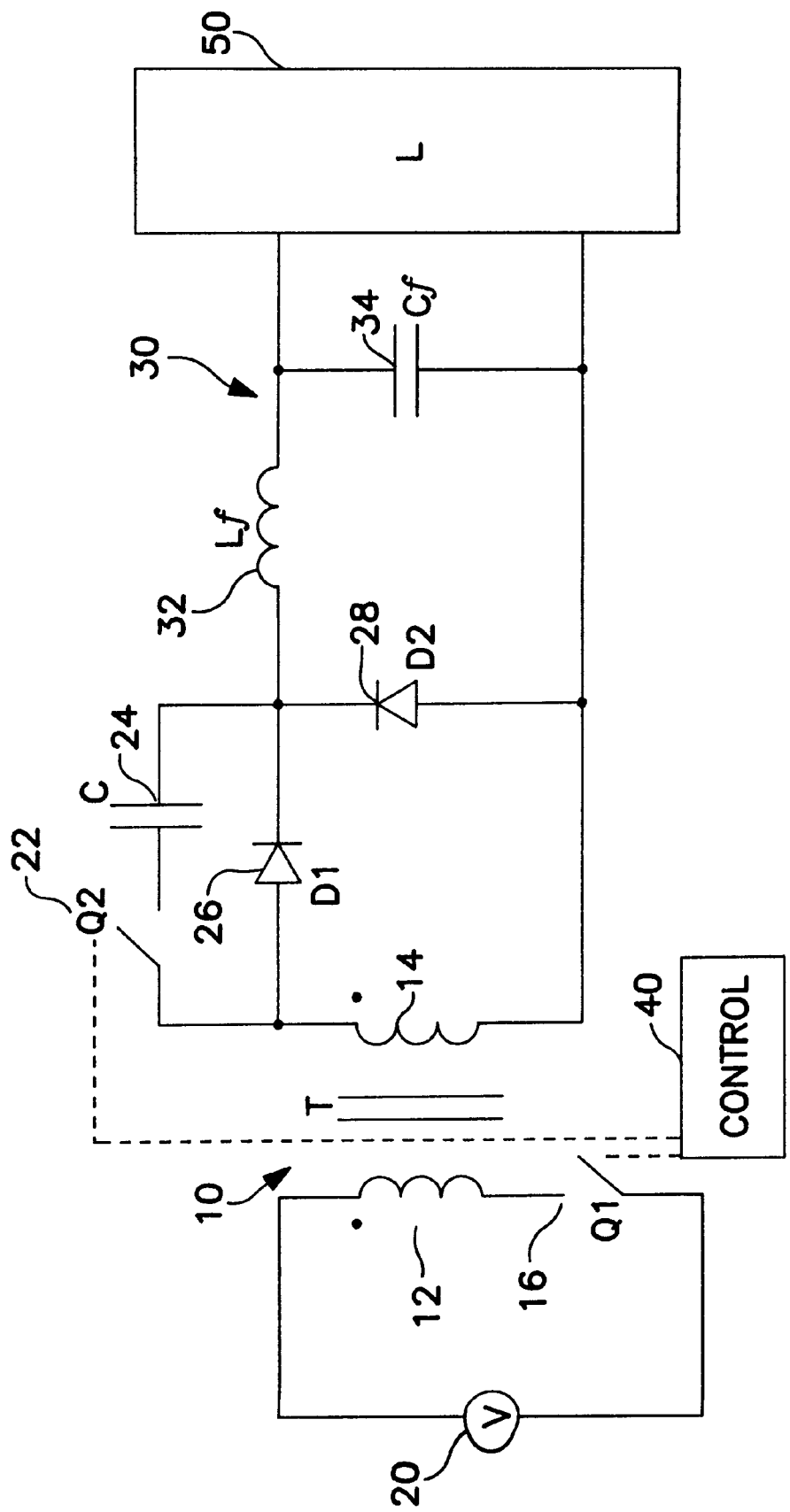
FIG. 1 is a single-ended forward DC-to-DC converter according to one embodiment of the invention.

An embodiment of the single ended forward DC-to-DC converter is shown in FIG. 1. As shown in this figure, a transformer 10 is electrically coupled between a DC power source 20, having a certain input voltage V, and a load 50. The transformer 10 includes a primary winding 12 and a secondary winding 14. Generally, the number of turns of the windings depends upon the desired output voltage at the load 50. In the telecommunications industry, for example, the input voltage is typically 48 V and the desired output voltage is typically 4 V, thus requiring a turns ratio of about 12:1.

For purposes of explanation only, however, the transformer 10 will be considered as having a turns ratio of 1:1. Electrically connected in series between the primary winding 12 and the source 20 is a primary switch 16, designated as Q1. When the switch 16 is on, that is, when the switch 16 is in the closed state, a closed circuit is formed, and current flows from the source 20 through the primary winding 12 and back to the source 20, inducing a voltage in the secondary winding 14.

Electrically connected in series with the secondary winding 14 is a secondary switch 22, designated as Q2, and a clamping capacitor 24. As will be further described below, the clamping capacitor 24 charges when the secondary switch 22 is on. A diode 26, designated by D1, is electrically connected in series with the secondary winding 14 of the transformer 10, and is electrically connected in parallel with the secondary switch 22 and the clamping capacitor 24. As will be further described below, the diode 26 is conductive when the primary switch 16 is on. A second diode 28, designated by D2, is electrically connected in parallel with the secondary winding 14 of the transformer 10. In electrical communication with the secondary winding 14 and the diode 26, is an LC circuit 30. The LC circuit 30 includes a filter inductor 32 in series with the secondary winding 14 and the diode 28, and a filter capacitor 34 in parallel with the secondary winding 14 and the diode 28. The diodes 26, 28 and the LC circuit 30, in combination, provide a rectifying and smoothing circuit, that filters the voltage from the secondary winding before it reaches the load 50.

A control device 40 is electrically coupled to the primary switch 16 and the secondary switch 22. The control device 40 controls the operation of the primary switch 16 and the secondary switch 22, causing them to turn on and off at desired times. The control device 40 preferably activates the switches 16, 22 out of phase, and in the present embodiment, the control device 40 can introduce a small period of delay, during which both switches 16, 22 are in an off-state. Such a period of delay can be configured such that the secondary switch 22 turns on after a predetermined period of time has elapsed after the primary switch 16 has turned off. This delay allows zero voltage switching to be accomplished, as the voltage at the primary switch 16 is returned to about zero volts before the primary switch 16 is again turned on. As will be further described, during this delay, a magnetizing current present in the transformer 10 after the primary switch 16 is turned off, is used to maintain a constant voltage across the secondary winding.

When the control device 40 causes the primary switch 16 to turn on, current flows through the primary winding 12, inducing a current in the secondary winding 14, which flows through the diode 26 to the LC circuit 30. The LC circuit 30 smoothes the voltage appearing across the secondary winding 14, and a DC output is obtained at the load 50. When the control device 40 causes the primary switch 16 to turn off, the forward transfer of current through the primary winding 12 and the secondary winding 14 terminates. The diode 28 then becomes conductive, allowing the energy stored in the field of the filter inductor 32 to be released into the filter capacitor 34 and the load 50. At this same time, magnetizing current in the transformer is stored in the clamping capacitor 24, which in turn, clamps the voltage at the secondary winding 14 of the transformer 10 to substantially the magnitude of the input voltage. The voltage at the secondary winding 14 thus remains substantially constant and the transformer 10 is reset, as the direction of the magnetic flux in the transformer is reversed.

The capacitance of the clamping capacitor 34 is sufficiently large such that the time dependence of the voltage across the clamping capacitor 34 is negligible. Under steady state conditions, the volt-second product impressed on the secondary winding 14 of the transformer 10 during the time period that the primary switch 16 is on, is equal to the volt-second product impressed on the secondary winding 14 when the primary switch 16 is off. This can be expressed mathematically for a transformer 10 having a turns ratio of 1:1, as:

$$(V_{in})(t_{on})=(V_c)(t_{off})$$

or, as:

$$V_c=(V_{in})(D/1-D),$$

where D is the duty cycle, $t_{on}$ is the period during which the primary switch 16 is on, and $t_{off}$ is the period during which the primary switch 16 is off.

Figure 2A:
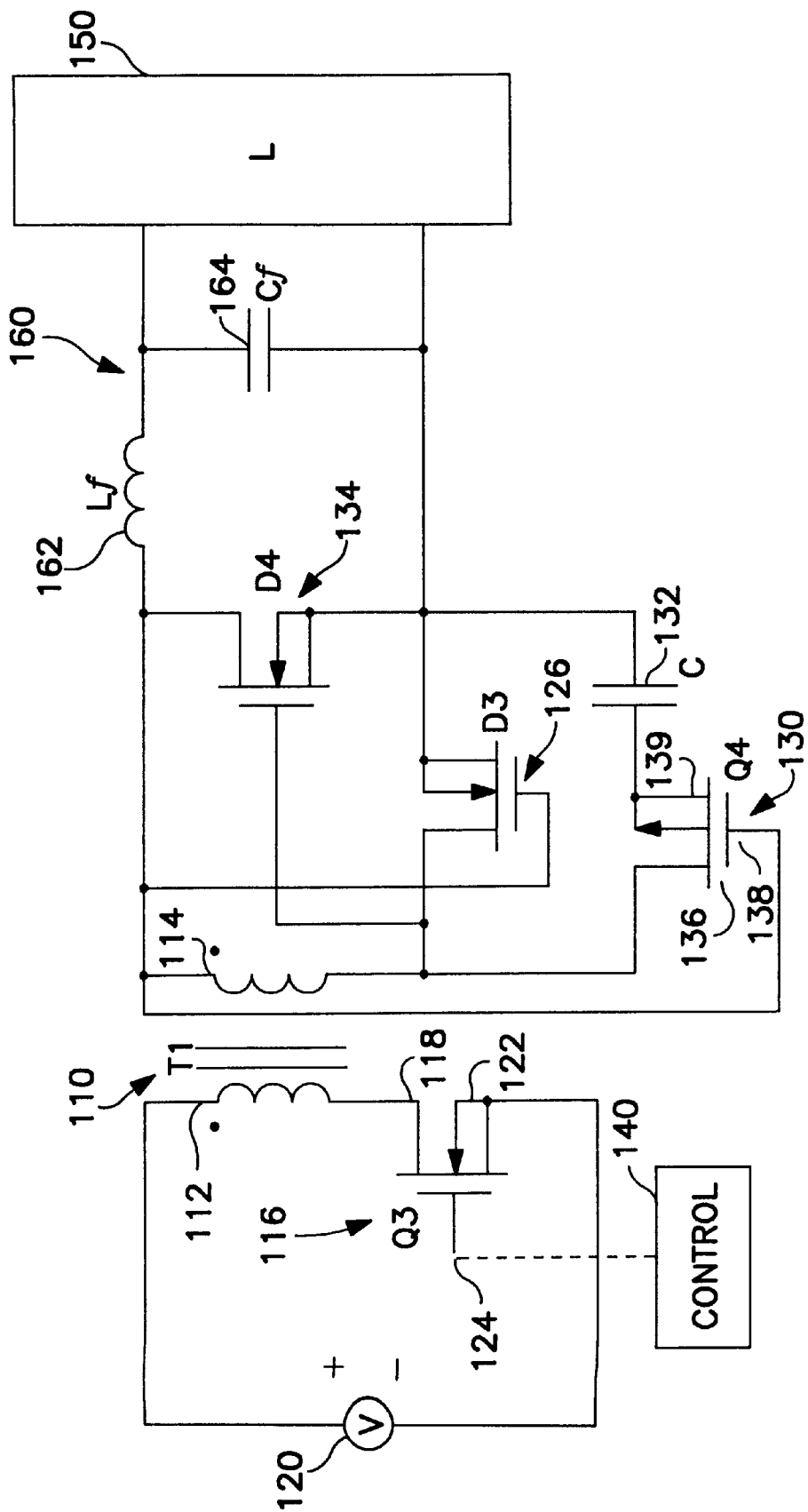
FIG. 2A is a single-ended forward DC-to-DC converter according to another embodiment of the invention.

Referring to FIG. 2A, shown is another embodiment of the single ended forward DC-to-DC converter of the present invention. As shown in this figure, a transformer 110 is electrically coupled between a DC power source 120 having a certain input voltage V, and a load 150. The transformer 110 includes a primary winding 112 and a secondary winding 114. Electrically connected in series with the primary winding 112 is a primary switch 116, a n-channel MOSFET designated by Q3. The primary winding 112 is electrically connected to the drain terminal 118 of the MOSFET 116 and a DC source 120 is electrically connected to the source terminal 122 of the MOSFET 116. In the present embodiment, a control device 140 is electrically connected to the gate terminal 124 of the MOSFET 116, and applies a voltage at the gate 124, selectively causing the MOSFET 116 to turn on. When the MOSFET 116 is on, it forms a closed circuit with the primary winding 112 and the voltage source 120. As an alternative configuration to the above-described circuit, note that the DC source 120 can be electrically connected to the drain terminal 118, and the primary winding 112 can be electrically connected to the source terminal 122, provided that the polarity of the input at the drain terminal 118 of the MOSFET 116 results in the MOSFET 116 becoming forward and reversed biased in response to an input from the control device 140 at the gate terminal 124.

A rectifier 126, a n-channel MOSFET designated as D3, is electrically connected in series with the secondary winding 114 of the transformer 10. As will be further described, the rectifier 126 is conductive when the MOSFET 116 is on. The rectifier 126 is in parallel with the secondary switch 130 and a clamping capacitor 132. In the present embodiment, the secondary switch 130 is a p-channel MOSFET, designated by Q4. The drain terminal 136 and the gate terminal 138 of the p-channel MOSFET 130, are connected across the secondary winding 114 such that the MOSFET 130 becomes forward biased in response to a change in the voltage across the secondary winding 114. The source terminal 139 is connected to the clamping capacitor 132. A second rectifier 134, a n-channel MOSFET designated by D4, is electrically connected in series with the clamping capacitor 132, and in parallel with the secondary winding 114 of the transformer 110. In electrical communication with the secondary winding 114 and the rectifier 134, is a LC circuit 160. As similarly described above, the LC circuit 160 includes a filter inductor 162 in series with the secondary winding 114 and the rectifier 134, and a filter capacitor 164 in parallel with the secondary winding 114 and the rectifier 134. The rectifiers 126 and 134 function to provide self-driven synchronous rectification. The rectifiers 126, 134 reduce the input voltage such that the voltage appearing across the LC circuit is lower. The combination of the rectifiers 126 and 134, and the LC circuit 160 provide a rectifying and smoothing circuit.

Figure 2B:
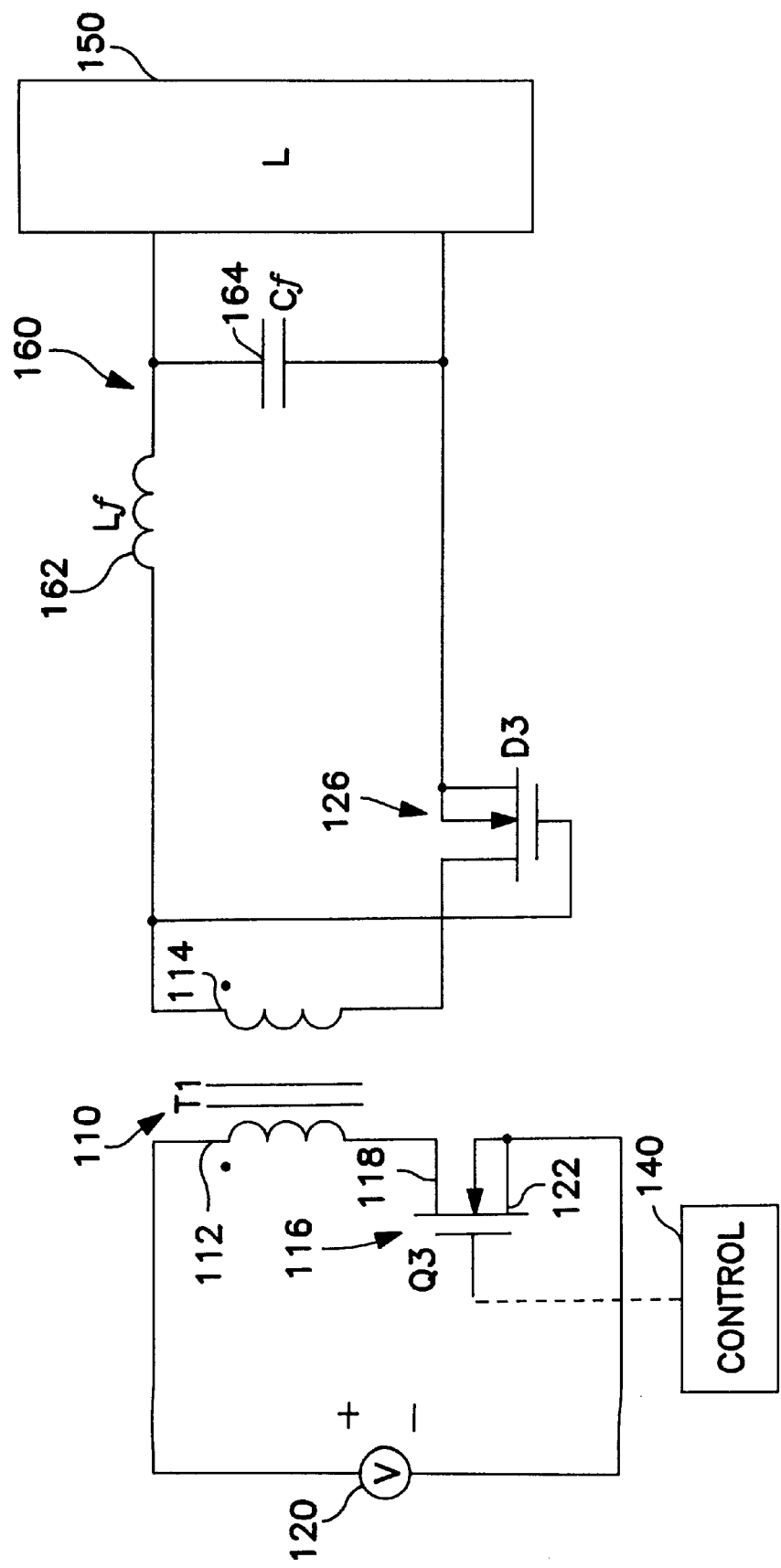

Referring to FIG. 2B, shown is a section of the circuitry of the converter of FIG. 2A that is conductive when the control device 140 causes the primary switch 116, n-channel MOSFET Q3, to turn on. When the MOSFET 116 is conducting, a closed circuit is thus formed, as an input voltage exists across the primary winding 112 causing current to flow from the voltage source 120, through the primary winding 112 of the transformer 110, and induce a voltage in the secondary winding 114. The voltage across the secondary winding 114 causes the rectifier 126 to be forward biased, and current flows through the LC circuit 160. The LC circuit 160 smoothes the voltage appearing across the secondary winding 114, and a DC output is obtained at the load 150.

Figure 2C:
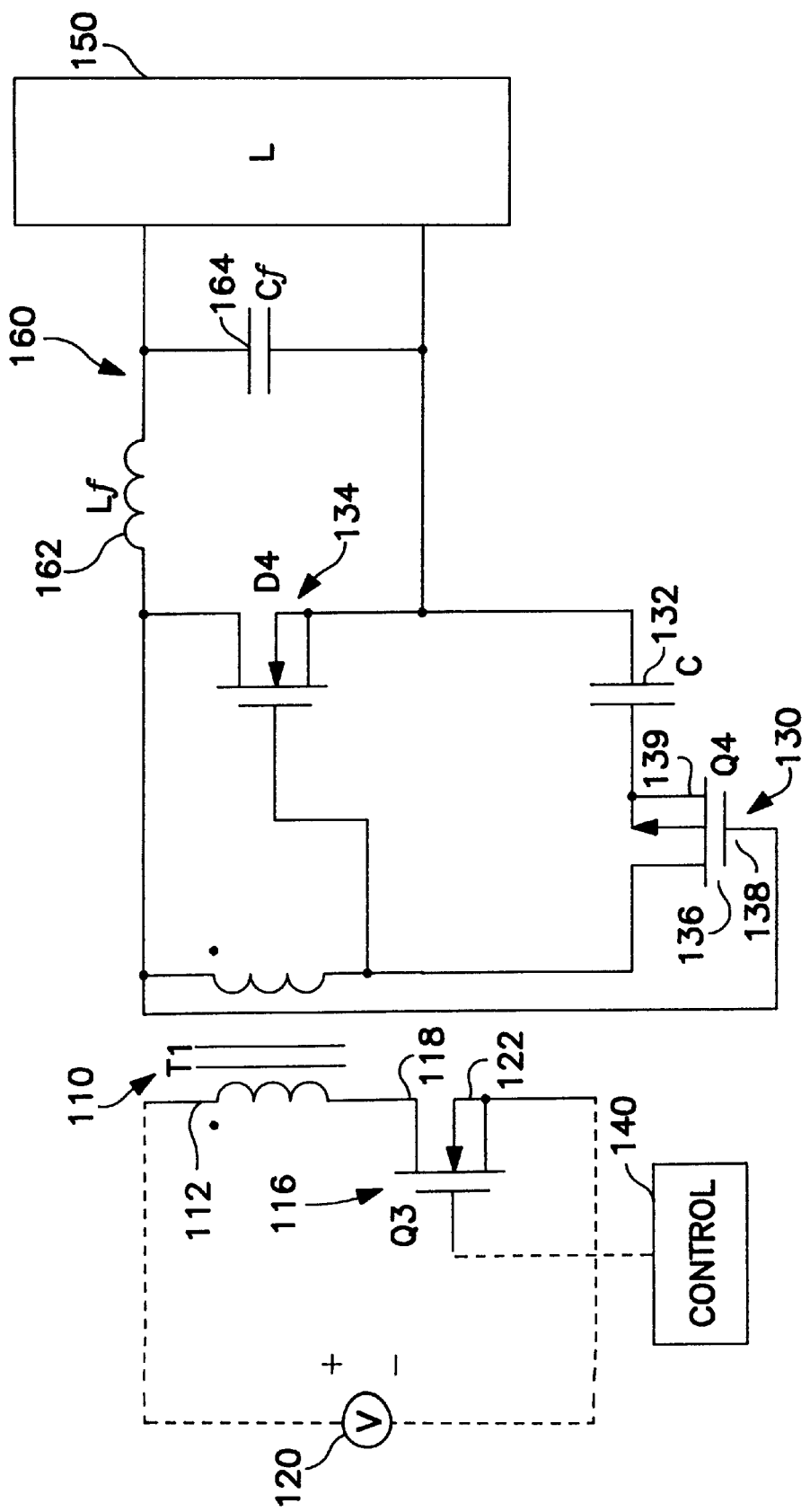
FIG. 2C is a section of the single-ended forward DC-to-DC converter of FIG. 2A that is conducting when the primary switch is off.

Referring to FIG. 2C, shown is a section of the circuitry of the converter of FIG. 2A that is conductive when the control device 140 causes n-channel MOSFET 116 to turn off Note that a dashed-line connection is shown between the DC source 120 and the primary winding 112 and MOSFET 116, to indicate that no current is flowing through the MOSFET 116 or the primary winding 112. When the n-channel MOSFET 116 is reversed biased, the forward transfer of current through the primary winding 112 to the secondary winding 114 terminates. The voltage across the secondary winding 114 causes the rectifier 134, n-channel MOSFET D4, to become forward biased, allowing the energy stored in the filter inductor 162 to release current into the filter capacitor 164 and the load 150. At the same time, the voltage across the secondary winding 114 causes the secondary switch 130, p-channel MOSFET Q4, to become conductive. The magnetizing current in the secondary winding 114 thus flows from the drain 136 to the source 139, causing the clamping capacitor 132 to charge. The clamping capacitor 132 thus clamps the voltage at the secondary winding 114 of the transformer 110 to substantially the input voltage V, during the time period that the n-channel MOSFET 116 is off. It is important to note that the self-driving characteristics of the secondary switch 130 obtained with the MOSFET Q4, eliminates the need for the control device 140 to be connected to the MOSFET 130 to turn it on and off.

Figure 3A:
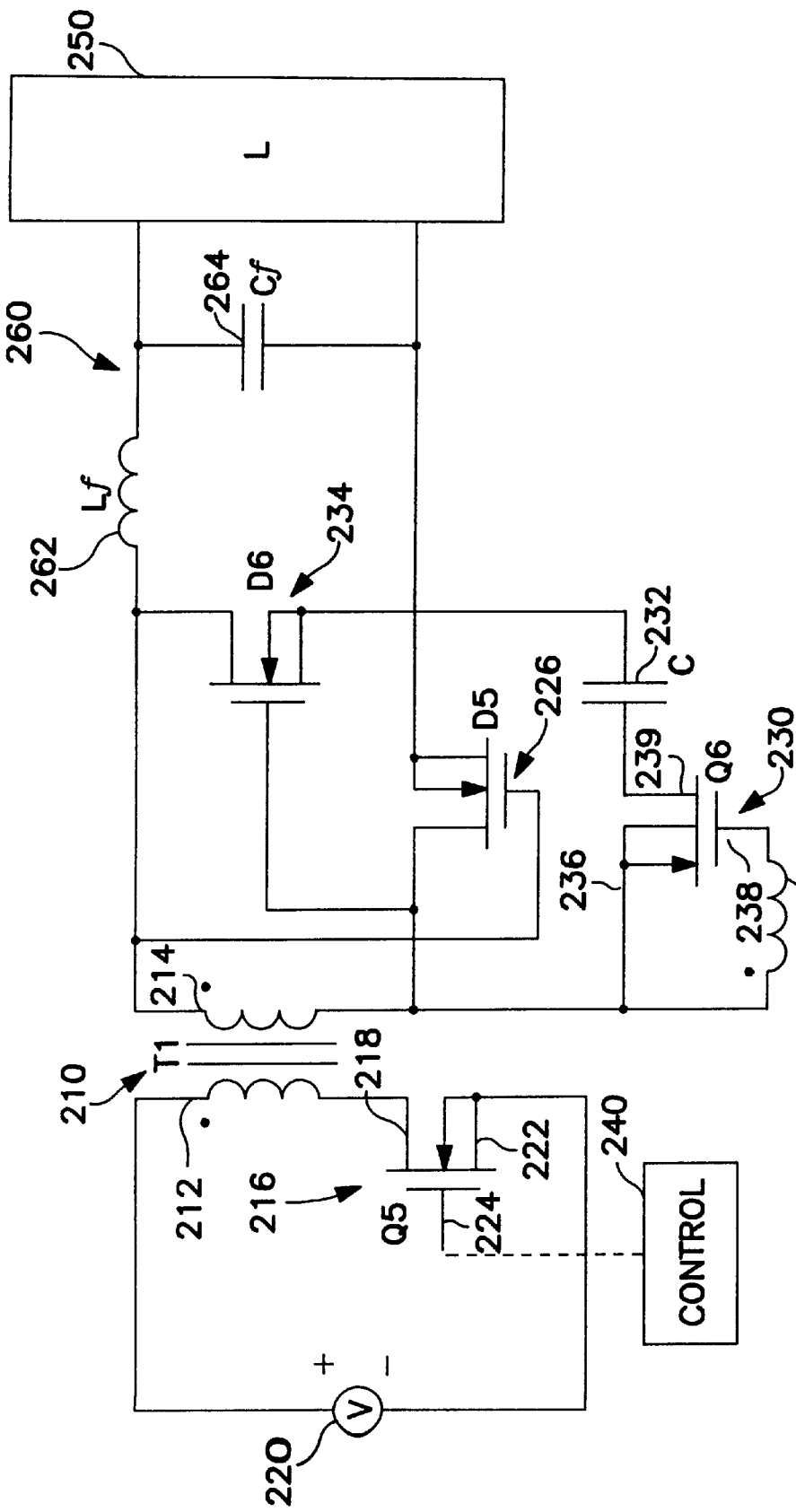
FIG. 3A is a single-ended forward DC-to-DC converter according to yet another embodiment of the invention.

Referring to FIG. 3A, shown is yet another embodiment of the single ended forward DC-to-DC converter of the present invention. As shown in this figure, a transformer 210 is electrically connected between a DC power source 220 having a certain input voltage, and a load 250. The transformer 210 includes a primary winding 212 and a secondary winding 214. Electrically connected in series with the primary winding 212 is a primary switch 216, a n-channel MOSFET designated by Q5. The primary winding 212 is electrically connected between the drain terminal 218 of the MOSFET 216 and the DC source 220, and the DC source 220 is also electrically connected to the source terminal 222 of the MOSFET 216. As stated above, the MOSFET 216 terminal connections may differ for the primary winding 212 and the voltage source 220, provided that the operation of the MOSFET 216 remains the same. A control device 240 is electrically connected to the gate terminal 224 of the MOSFET 216, and applies a voltage at the gate 224, selectively causing the MOSFET 216 to become conductive. When the MOSFET 216 is conducting, it forms a closed circuit with the primary winding 112 and the voltage source 120.

Electrically connected in series with the secondary winding 214 is a secondary switch 230, n-channel MOSFET designated by Q6, which is conductive when the primary switch 216, n-channel MOSFET Q5, is off. The gate terminal 238 of the n-channel MOSFET 230 is electrically connected to a third winding 237 of the transformer, which is in parallel with the output of the drain terminal 236. The third winding 237 provides the positive voltage necessary to turn on the secondary switch 230. The source terminal 239 of the MOSFET 230 is electrically connected to a clamping capacitor 232. A rectifier 226, n-channel MOSFET designated as D5, is also electrically connected in series with the secondary winding 214 of the transformer 210. The rectifier 226 is conductive when the MOSFET 216, is conductive. The rectifier 226 is also in parallel with the secondary switch 230, MOSFET Q6, and the clamping capacitor 232. A second rectifier 234, a n-channel MOSFET designated by D6, is electrically connected in series with the clamping capacitor 232, and in parallel with the secondary winding 214 of the transformer 210. In electrical communication with the secondary winding 214 and the rectifier 234, is a LC circuit 260. The LC circuit 260 comprises a filter inductor 262 in series with the secondary winding 214 and the rectifier 234, and a filter capacitor 264 in parallel with the secondary winding 214 and the rectifier 234. As described above, the rectifiers 226 and 234, and the LC circuit 260, provide a rectifying and smoothing circuit.

Figure 3B:
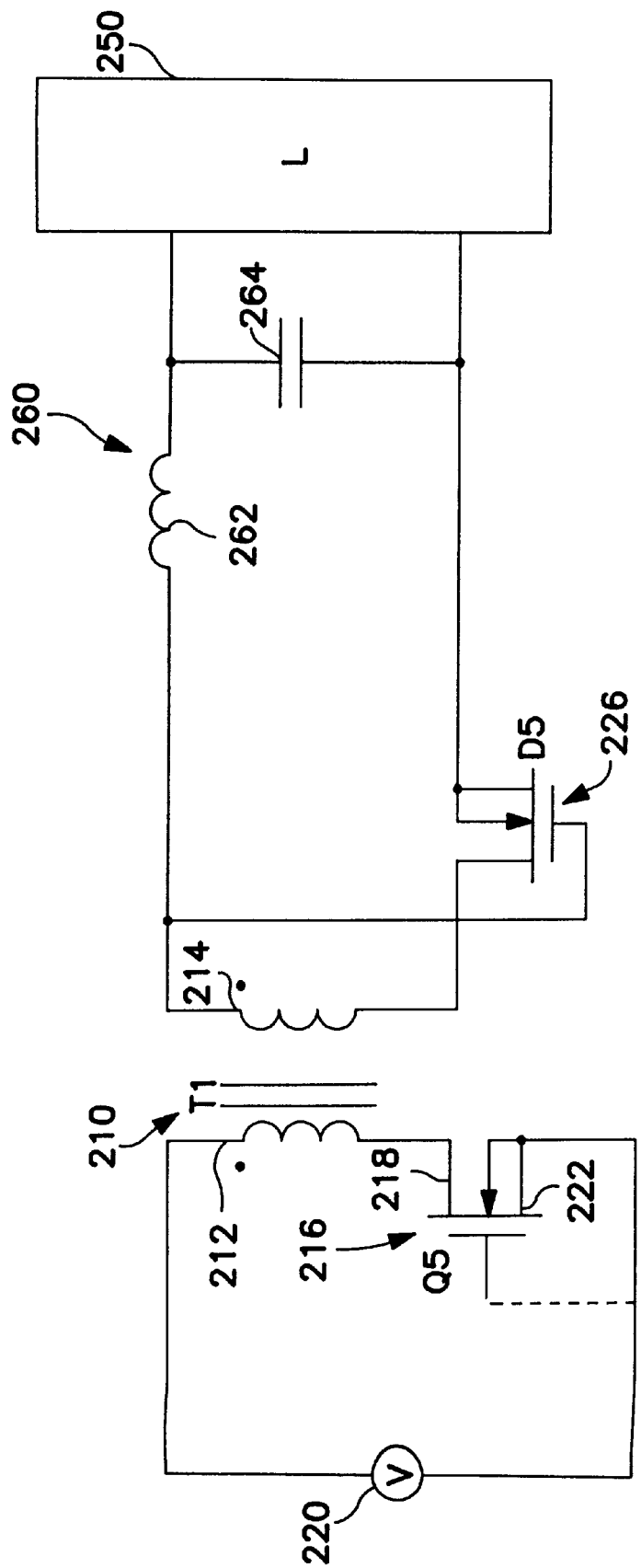

Referring to FIG. 3B, shown is a section of the circuitry of the converter of FIG. 3A, which is conductive when the control device 240 causes the primary switch 216, n-channel MOSFET Q5 to become conductive. When the MOSFET Q5 is conductive, a closed circuit is thus formed, and an input voltage exists across the drain 218 and the source 222 causing current to flow from the voltage source 220, through the primary winding 212 of the transformer 210, inducing a voltage in the secondary winding 214. The voltage across the secondary winding 214 causes the rectifier 226, MOSFET D5, to be forward biased, and current flows through the LC circuit 260. The LC circuit 260 smoothes the voltage appearing across the secondary winding 214, and a DC output is obtained at the load 250.

Figure 3C:
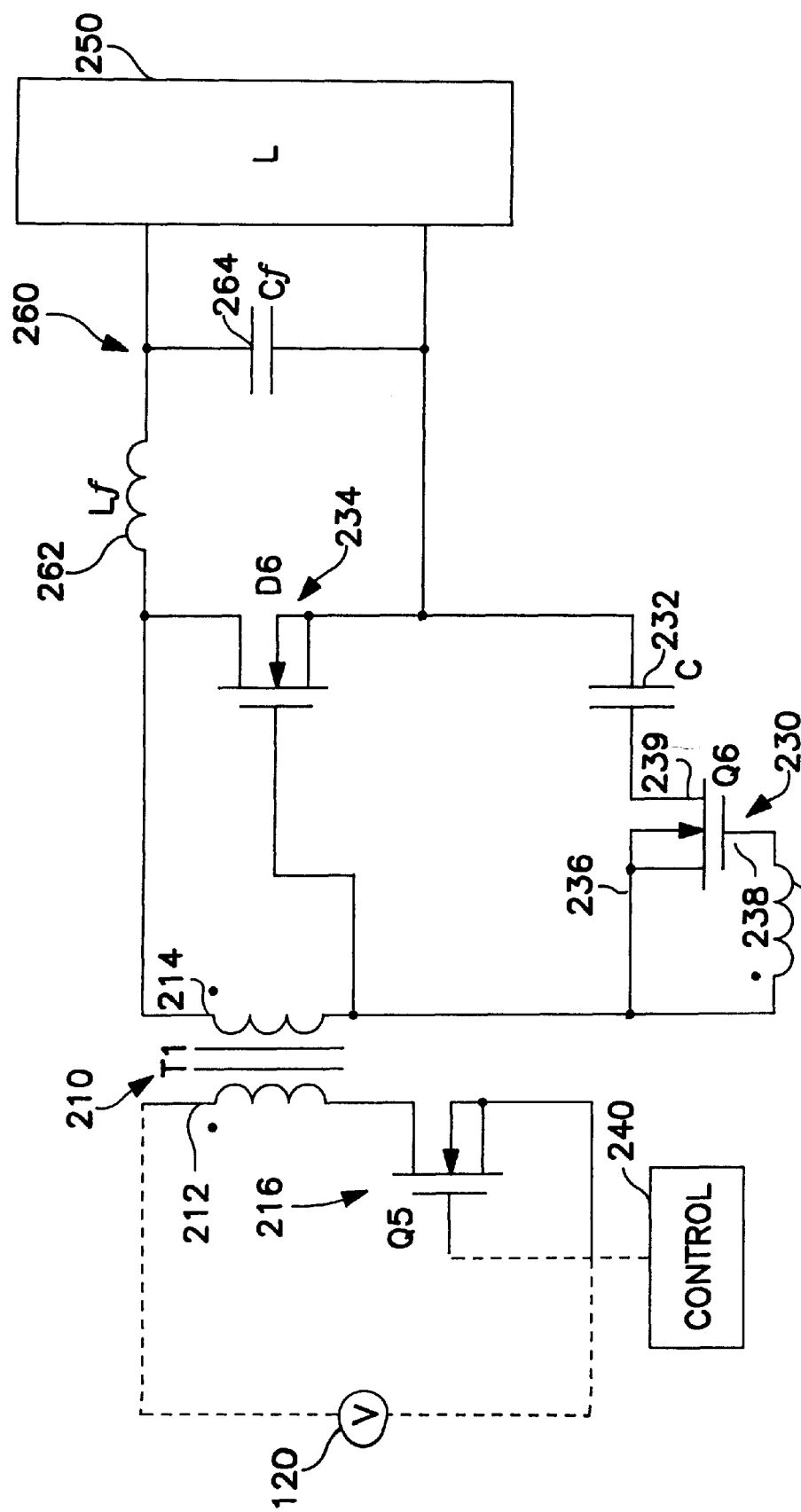
FIG. 3C is a section of the single-ended forward DC-to-DC converter of FIG. 3A that is conducting when the primary switch is off.

Referring to FIG. 3C, shown is a section of the circuitry of FIG. 3A which is conductive when the control device 240 causes the MOSFET 216, to turn on. When the MOSFET 216 is off, the forward transfer of current through the primary winding 212 and the secondary winding 214 terminates. Note again, that a dashed-line connection is shown between the DC source 220 and the primary winding 212, and MOSFET 216, to indicate that no current is flowing through the MOSFET 216 or the primary winding 212. When the MOSFET 216 is off, a positive voltage appears across the third winding 214 that causes the n-channel MOSFET 230 to become conductive. Again, it is important to note that the self-driving characteristics of the secondary switch 230 obtained with the MOSFET Q6, eliminates the need for the control device 240 to be connected to the switch 230 to turn it on and off.

As similarly described above, when the secondary switch 230 is on, the magnetizing current in the secondary winding 214 thus flows from the drain 236 to the source 239, causing the clamping capacitor 232 to charge. The clamping capacitor 232 thus clamps the voltage at the secondary winding 214 of the transformer 210 to substantially the magnitude of the input voltage. Additionally, the voltage across the secondary winding 214 causes the rectifier 234, MOSFET D6, to become forward biased, allowing the energy stored in the filter inductor 262, to be released into the filter capacitor 264 and the load 250.

In each of the above embodiments, the clamping capacitor and the secondary winding of the transformer form a resonant circuit, as the clamping capacitor recycles the magnetization energy in the transformer so that the voltage at the transformer will not go below the voltage of the clamping capacitor. As a result, the transformer is effectively reset, and stresses across the primary switch are minimized.

Figure 4A:
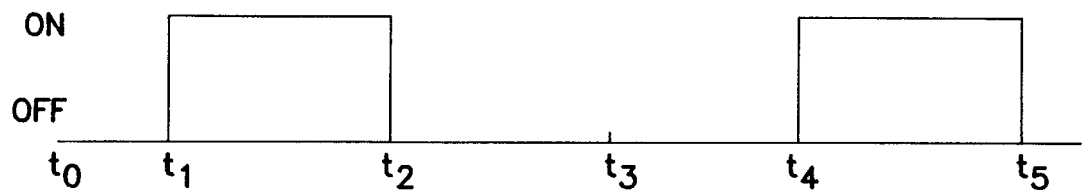
FIG. 4A is a waveform showing the periods during which the primary switch of the single-ended forward DC-to-DC converter is on and off.
Figure 4B:
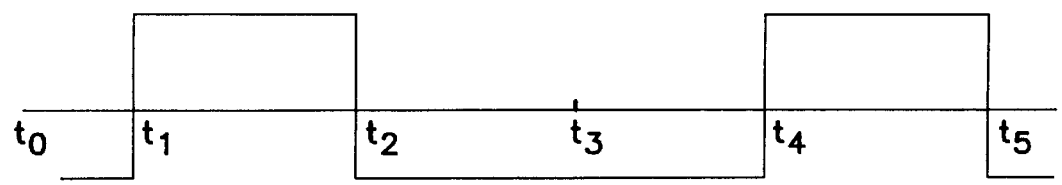
FIG. 4B is a waveform showing the voltage across the primary winding of the transformer of the single-ended forward DC-to-DC converter during the periods when the primary switch is on and off.

These features of the present invention are further exhibited in FIGS. 4A–4D. Referring to FIG. 4A, shown is a timing diagram of the primary switch (16, 116, 216). As shown, the waveform is periodic; between times $t_1$ and $t_2$, the switch (16, 116, 216) is off, between times $t_2$ and $t_4$ the switch (16, 116, 216) is off, and between times $t_4$ and $t_5$ the switch (16, 116, 216) is again on. Referring to FIG. 4B, shown is the voltage that exists across the primary winding (12, 112, 212) of the transformer (10, 110, 210) during the on and off periods of the primary switch (16, 116, 216). As shown, when the primary switch (16, 116, 216) is on, i.e. between time periods $t_1$ and $t_2$, and $t_4$ and $t_5$, the voltage across the primary winding (12, 112, 210) is high. When the primary switch (16, 116, 216) is off, during the time period between $t_2$ and $t_4$, the voltage across the primary winding (10, 110, 210) is low.

Figure 4C:
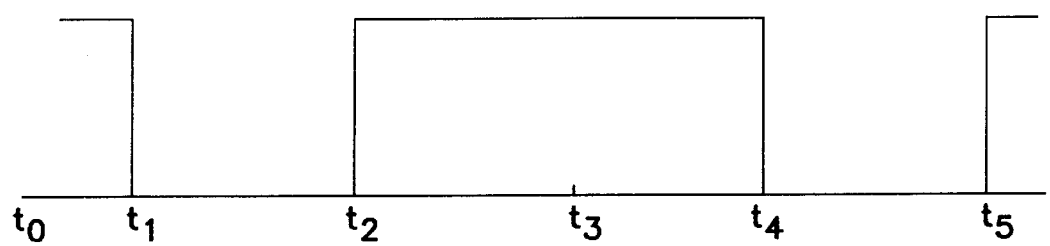
FIG. 4C is a waveform showing the voltage across the primary switch of the single-ended forward DC-to-DC converter during the periods when the primary switch is on and off.
Figure 4D:
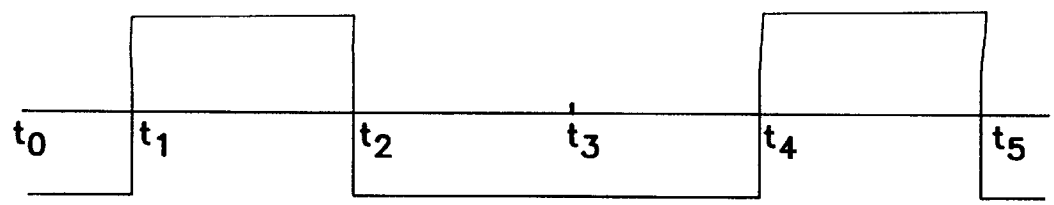
FIG. 4D is a waveform showing the voltage across the secondary winding of the transformer of the single-ended forward DC-to-DC converter during the periods when the primary switch is on and off.

Referring to FIG. 4C, shown is the voltage that exists across the primary switch (16,116, 216) shown in FIGS. 2A and 3A. As shown by the waveforn, between times $t_2$ and time $t_4$ when the switch is open, the voltage remains constant at the input voltage, and returns to zero volts just as the switch turns on again at time $t_4$. Referring to FIG. 4D, shown is the voltage that exists across the secondary winding (14, 114, 214) of the transformer (10, 110, 210) during the on and off periods of the primary switch (16, 116, 216). As shown, when the primary switch (16, 116, 216) is on, between time periods $t_1$ and $t_2$, and $t_4$ and $t_5$, the voltage across the secondary winding (14, 114, 214) is high. When the primary switch (116, 216) is off, between time period $t_2$, and $t_4$ the voltage across the secondary winding (114, 214) is at a negative voltage. This voltage is constant during the entire period that the primary switch (16, 116, 216) is off, due to the effects of the clamping capacitor (24, 132, 232) having stored the magnetization energy dissipated from the secondary winding (14, 114, 214). This negative voltage causes the direction of the flux in the transformer to change, and the transformer core to be reset as a result.

As shown in the above FIGS. 4A–4D, the DC-to-DC converter described in the above embodiments eliminates the undesirable dead time common to conventional converters. Moreover, the constant voltage across the secondary winding during the off period of the primary switch effectively resets the transformer core. Such an enhanced resetting technique lends itself to self-driven synchronous rectification, which is useful in applications requiring a lower output voltage and a higher power density at the load.

Trends in the power conversion industry mandate lower output voltages and higher power densities. Synchronous rectification and zero voltage switching are among those techniques used to meet these challenges. Synchronous rectification can be accomplished using the DC-to-DC converter of the present invention, as the rectifiers, operating out of phase, provide a reduced a input voltage to the LC filter circuit. The present invention further provides self-driven synchronous rectification, as the rectifiers are driven by the voltage across the secondary winding of the transformer. Moreover, the resetting technique of the present invention enhances synchronous rectification, as the performance of self-driven synchronous rectifiers is dependent upon the resetting of the transformer core.

Zero voltage switching can further be carried out by the present invention. The present invention uses the magnetizing current in the transformer to reduce the voltage across the primary switch to a value near zero volts before the switch is again turned on. Power dissipation in the switch is thus greatly reduced.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A single-ended DC converter comprising:

a plurality of coupled inductors comprising a primary inductor and a secondary inductor, the secondary inductor having a first terminal and a second terminal;

a primary switching transistor in electrical communication with said primary inductor, said primary switching transistor being active upon application of an input;

a secondary switching transistor having a first terminal, and a second terminal, and having a control terminal in electrical communication with said second terminal of said secondary inductor;

a capacitor having a first terminal in electrical communication with said second terminal of said secondary switching transistor and having a second terminal, one of said second terminal of said capacitor and said first terminal of said secondary switching transistor in electrical communication with said secondary inductor;

whereby when a first voltage appears at said secondary inductor, said secondary switching transistor is off, and when a second voltage of opposite polarity to said first voltage appears at said secondary inductor, said secondary switching transistor turns on and said capacitor clamps said secondary inductor at a constant voltage, causing the resetting of said coupled inductors and wherein said secondary switching transistor turns on after said primary switching transistor turns off.

2. The single-ended DC converter according to claim 1, wherein said primary switching transistor has a terminal connected to said primary inductor, and a control circuit connected to said control terminal.

3. The single-ended DC converter according to claim 1, wherein said secondary switching transistor self-activates when said primary switching transistor becomes inactive.

4. The single-ended DC converter according to claim 1, further comprising a third inductor in series with said secondary inductor.

5. The single-ended DC converter according to claim 4, wherein said secondary switching transistor has a control terminal and a terminal coupled to said third inductor.

* * * * *